United States Patent
Hirayama

(10) Patent No.: US 7,120,294 B2
(45) Date of Patent: Oct. 10, 2006

(54) IMAGE FORMING APPARATUS AND IMAGE FORMING METHOD

(75) Inventor: Masatsugu Hirayama, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 760 days.

(21) Appl. No.: 10/382,882

(22) Filed: Mar. 7, 2003

(65) Prior Publication Data

US 2003/0184775 A1 Oct. 2, 2003

(30) Foreign Application Priority Data

Apr. 2, 2002 (JP) ............................. 2002-100484

(51) Int. Cl.
- G06K 9/00 (2006.01)
- H04N 1/46 (2006.01)
- G06K 9/40 (2006.01)

(52) U.S. Cl. ....................................... 382/162; 358/501

(58) Field of Classification Search ................. 358/1.9, 358/2.1, 3.24, 3.26, 3.27, 447, 462, 463, 358/501, 504, 505, 512, 515, 518, 532; 382/162, 382/164, 167, 254, 260, 263, 275, 305; 345/589, 345/600–604
See application file for complete search history.

(56) References Cited

U.S. PATENT DOCUMENTS

| | | | | |
|---|---|---|---|---|
| 5,113,251 A | * | 5/1992 | Ichiyanagi et al. | ......... 358/500 |
| 5,132,786 A | * | 7/1992 | Ishiwata | ...................... 358/500 |
| 5,617,224 A | * | 4/1997 | Ichikawa et al. | ........... 358/530 |
| 5,748,335 A | * | 5/1998 | Honma et al. | .............. 358/445 |
| 6,473,204 B1 | * | 10/2002 | Suzuki et al. | ................ 358/448 |
| 6,480,300 B1 | * | 11/2002 | Aoyama | ..................... 358/1.9 |
| 6,535,301 B1 | * | 3/2003 | Kuwata et al. | .............. 358/1.9 |
| 6,603,878 B1 | * | 8/2003 | Takemoto | ................... 382/167 |
| 7,054,036 B1 | * | 5/2006 | Hirayama | .................... 358/2.1 |
| 2003/0030827 A1 | * | 2/2003 | Hirayama | .................... 358/1.9 |
| 2003/0142355 A1 | * | 7/2003 | Hirayama | .................... 358/2.1 |
| 2003/0184775 A1 | * | 10/2003 | Hirayama | .................... 358/1.9 |
| 2004/0042019 A1 | * | 3/2004 | Moro | ........................ 358/1.9 |

FOREIGN PATENT DOCUMENTS

JP 7-230547 A 8/1995

OTHER PUBLICATIONS

U.S. Appl. No. 10/054,953, filed Jan. 25, 2002, Hirayama.

* cited by examiner

Primary Examiner—Amir Alavi
(74) Attorney, Agent, or Firm—Foley & Lardner LLP

(57) ABSTRACT

A main CPU re-calculates, when the degree of sharpness has been adjusted, a coefficient in accordance with the value of adjustment. The main CPU finds a maximum bit number from the calculated filter coefficients, effects a bit shift of the filter coefficients in accordance with the size (bit width) of a filter coefficient register, and stores the bit-shifted filter coefficients in the filter coefficients register, thus carrying out a filtering process.

9 Claims, 6 Drawing Sheets

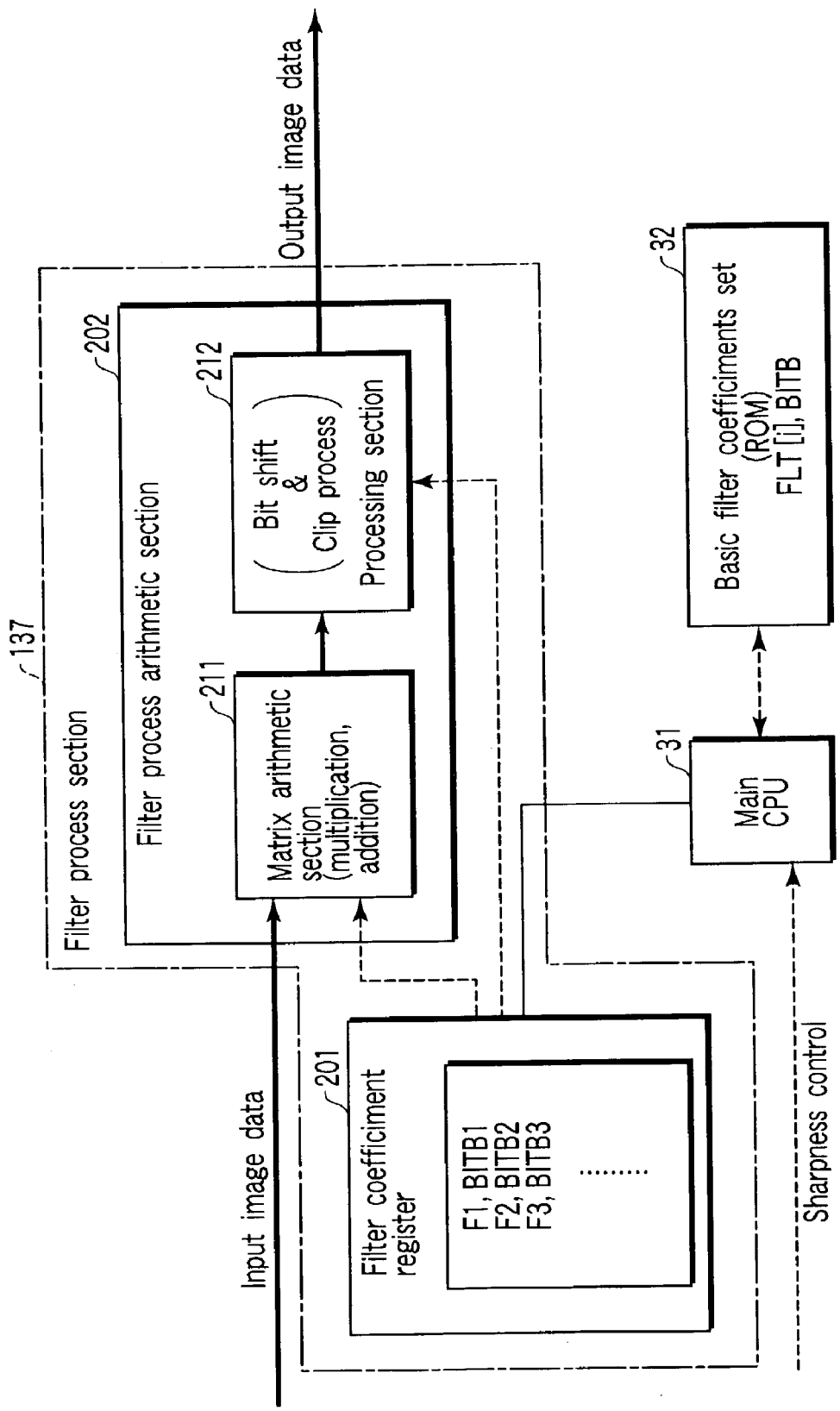
F I G. 5

IMAGE FORMING APPARATUS AND IMAGE FORMING METHOD

CROSS-REFERENCE TO RELATED APPLICATIONS

This application is based upon and claims the benefit of priority from the prior Japanese Patent Application No. 2002-100484, filed Apr. 2, 2002, the entire contents of which are incorporated herein by reference.

BACKGROUND OF THE INVENTION

1. Field of the Invention

The present invention relates to an image forming apparatus such as a digital copying machine, and to an image forming method, for reading an image on a color original by image reading means such as a color scanner, processing the read image data, and forming an image by means of a printer.

2. Description of the Related Art

In the prior art, input image data is subjected to a filtering process to control the degree of sharpness.

When the sharpness is controlled and it is desired to vary the degree of sharpness among plural areas such as character areas/photo areas, this desire can be satisfied by adopting a structure permitting setting of the degree of sharpness in the respective areas.

However, when arithmetic operations for the filtering process are performed, an arithmetic error, such as cancellation of significant digits, may occur depending on the precision (bit number) of an arithmetic circuit and a decimal point position of the arithmetic result.

For example, when a difference is large between a maximum absolute-value coefficient and a minimum absolute-value coefficient in a group of coefficients constituting the filter, an arithmetic result may be rounded down because it is too small relative to the precision of the arithmetic circuit.

BRIEF SUMMARY OF THE INVENTION

The object of the present invention is to provide an image forming apparatus and an image forming method capable of suppressing an adverse effect of an error in filtering arithmetic operations.

In order to achieve the object, the present invention may provide an image forming apparatus which reads a color image on an original and subjects a signal of the read color image to image processing, thus forming a color image, the apparatus comprising: an image reading section which reads a color image on an original; a first memory section which stores basic filter coefficients and decimal-point reference position information for subjecting a color image signal of the color image read by the image reading section to image processing; a second memory section which has a predetermined bit width and stores filter coefficients; a calculation section which re-calculates, when a degree of sharpness has been adjusted in the image processing, the basic filter coefficients stored in the first memory section in accordance with a value of the adjustment; a computing section which calculates a bit number between a lowest bit and a highest bit, which are obtained by expressing in binary form a coefficient with a maximum absolute value of the filter coefficients calculated by the calculation section; a first processing section which effects a bit shift of the filter coefficients calculated by the calculation section and stores the bit-shifted filter coefficients in the second memory section, on the basis of the bit number calculated by the computing section and the bit width of the second memory section; an altering section which alters the decimal-point reference position information on the basis of the decimal-point reference position information stored in the first memory section and the bit width of the second memory section; an arithmetic section which subjects the filter coefficients stored in the second memory section and the color image signal of the color image read by the image reading section to a matrix arithmetic operation in the processing of the first processing section; and a second processing section which effects a bit shift of the image signal produced by the arithmetic section, on the basis of the decimal-point reference position information altered by the altering section.

The invention may also provide an image forming method for forming a color image by reading a color image on an original and subjecting a signal of the read color image to image processing, the method comprising: reading a color image on an original; storing basic filter coefficients and decimal-point reference position information for subjecting a color image signal of the read color image to image processing; re-calculating, when a degree of sharpness has been adjusted in the image processing, the stored basic filter coefficients in accordance with a value of the adjustment; calculating a bit number between a lowest bit and a highest bit, which are obtained by expressing in binary form a coefficient with a maximum absolute value of the calculated filter coefficients; performing a process for effecting a bit shift of the calculated filter coefficients and storing the bit-shifted filter coefficients, on the basis of the calculated bit number and a bit width of a memory section that stores the calculated filter coefficients; altering the decimal-point reference position information on the basis of the stored decimal-point reference position information and the bit width of the memory section; subjecting the filter coefficients stored in the memory section and the color image signal of the read color image to a matrix arithmetic operation in the process; and effecting a bit shift of the image signal produced by the matrix arithmetic operation, on the basis of the altered decimal-point reference position information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram schematically showing the structure of a filter process section.

DETAILED DESCRIPTION OF THE INVENTION

An embodiment of the present invention will now be described with reference to the accompanying drawings.

Figure 1:
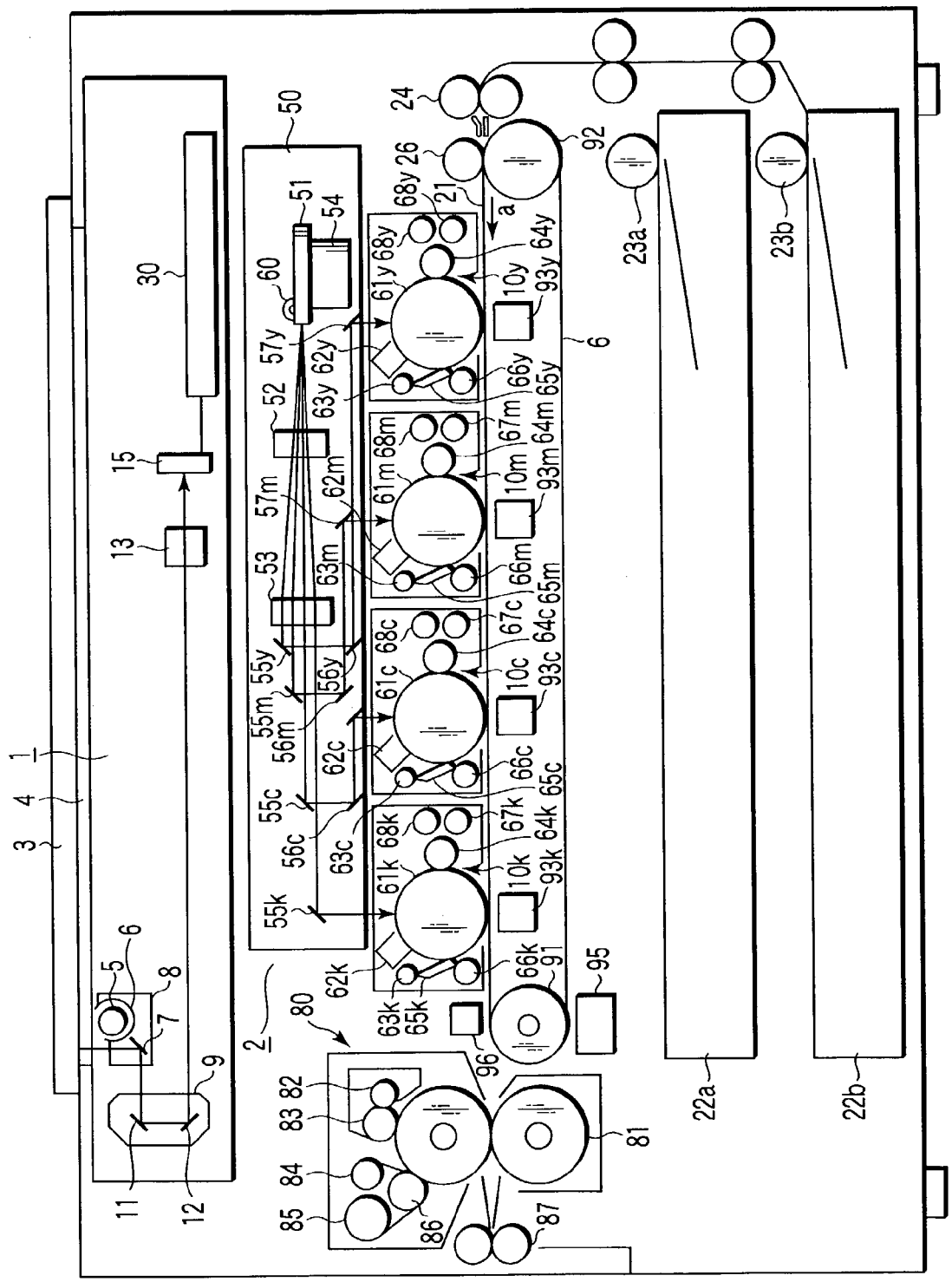
FIG. 1 schematically shows an internal structure of a digital color copying machine according to an image forming apparatus of the present invention.

FIG. 1 schematically shows an internal structure of a digital color copying machine according to an image forming apparatus of the present invention. In general terms, the digital color copying machine comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left in the Figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the Figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the Figure) deflecting the reflection light from the original which has been guided by the first mirror 7, and a third mirror 12 for deflecting the reflection from the second mirror 11 to the right in the Figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13. An output from the CCD color image sensor 15 is delivered to a main control section 30 (to be described later).

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10y, 10m, 10c and 10k for producing images of four colors, yellow (Y), magenta (M), cyan (C) and black (K), which are color-separated according to a well-known subtractive color mixing process.

A convey mechanism 20 is disposed below the image forming units 10i y, 10m, 10c and 10k. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10y, 10m, 10c and 10k are arranged in tandem in the direction of conveyance of the convey belt 21.

Each of the image forming unit 10y, 10m, 10c and 10k includes a photosensitive drum 61y, 61m, 61c, 61k serving as an image carrying body. The photosensitive drums 61y, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media, on which images formed by the image forming units 10y, 10m, 10c, 10k are to be transferred, are disposed below the convey mechanism 20.

A pick-up roller 23a, 23b is disposed at one end of each of the sheet cassettes 22a, 22b and on a side close to the driven roller 92. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61m, 61c and 61k are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing apparatus 36 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
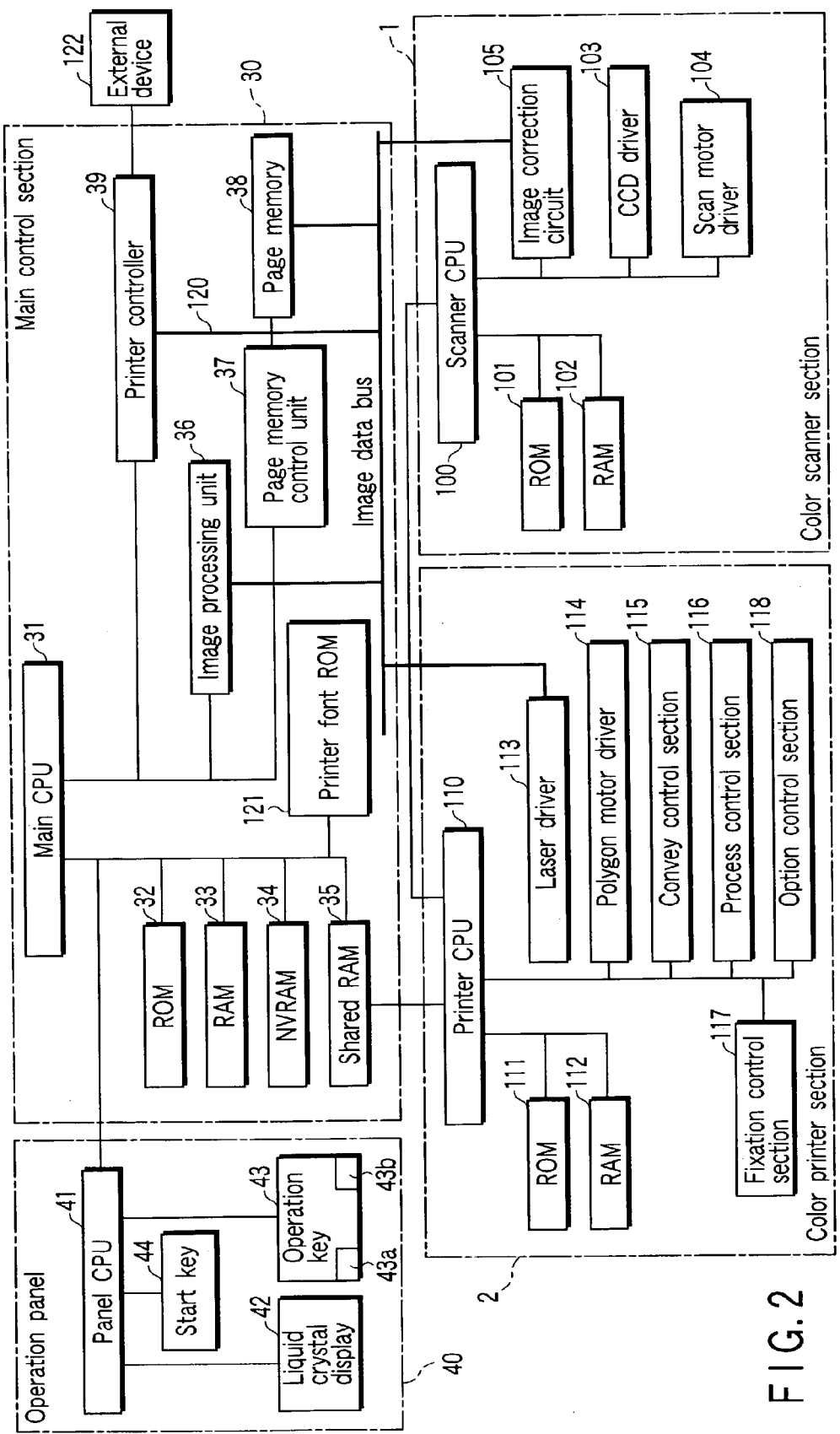
FIG. 2 is a block diagram schematically illustrating electrical connection in the digital color copying machine, and a flow of signals for control.

FIG. 2 is a block diagram schematically showing electrical connection of the digital color copying machine shown in FIG. 1 and flow of signals for control. In FIG. 2, a control system comprises three CPUs (Central Processing Units): a main CPU 31 provided in a main control section 30; a scanner CPU 100 in the color scanner section 1; and a color printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 including a sharpness control key 43a and an original mode select key 43b, a start key 44, and a panel CPU 41 to which these are connected. The operation panel 40 is connected to the main CPU 31.

The sharpness control key 43a is a key for adjusting the degree of sharpness in several steps (from "High" to "Low").

The original mode select key 43b is a key for selecting one of a standard mode, a character mode and a photo mode. The character mode is suitable for copying an original on which only characters (or characters/lines) appear. The photo mode is suitable for copying a monochromatic photo, a color photo, a photogravure, etc. Normally, the standard mode is selected and ordinary originals are copied in this mode.

The start key 44 is a key to be depressed to start a copying operation.

The main control section 30 comprises the main CPU 31, a ROM (Read-Only Memory) 32, a RAM 33, an NVRAM 34, shared RAM 35, image processing unit 36, a page memory control unit 37, a page memory 38, a printer controller 39, and a printer font ROM 121.

The main CPU 31 controls the entirety of the main control section 30. As will be described later in detail, the main CPU 31 also performs filtering arithmetic operations.

The ROM 32 stores control programs, etc. As will be described later in detail, the ROM 32 stores filter coefficients prepared for a filtering process and a decimal-point reference position.

The RAM 33 temporarily stores data.

The NVRAM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting RGB analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing unit 36, page memory 38, printer controller 39, image correction section 105 and laser driver 113 are connected over an image data bus 120.

Figure 3:
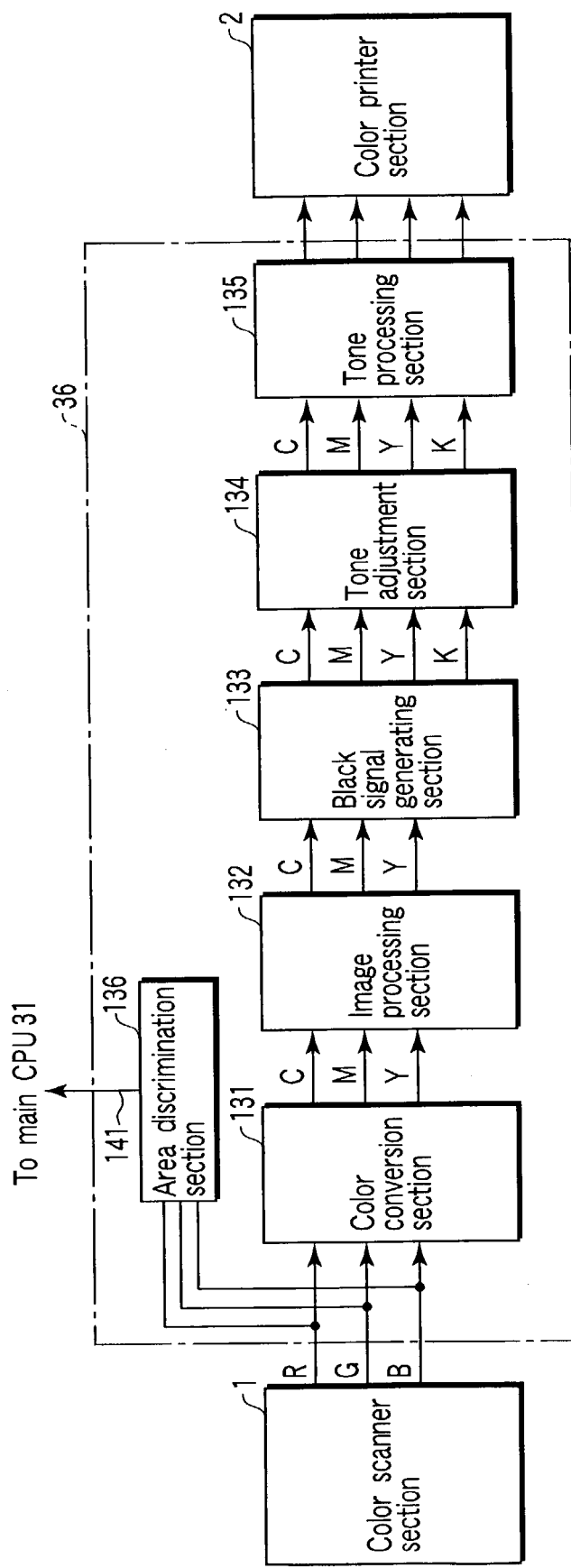
FIG. 3 is a block diagram schematically showing the structure of an image processing unit.

FIG. 3 schematically shows the structure of the image processing unit 36. In FIG. 3, image data R (red), G (green), B (blue) output from the color scanner section 1 is sent respectively to a color conversion section 131 in the image processing unit 36. The color conversion section 131 converts the input image data R, G, B to color signals of C (cyan), M (magenta) and Y (yellow) that are print colors. The color signals C, M and Y from the color conversion section 131 are sent to an image processing section 132. The image processing section 132 subjects the input color signals C, M and Y to various processings. Color signals C, M and Y output from the image processing section 132 are delivered respectively to a black signal generating section 133.

The black signal generating section 133 generates a signal of K (black) on the basis of the input color signals C, M and Y. Where color printing is effected, if three inks of C, M and Y are used, gray close to black is produced. In order to exactly print a black area as black pixels, the signal (K) for the black portion is produced. The signals of C, M, Y and K output from the black signal generating section 133 are sent to a tone adjustment section 134.

The tone adjustment section 134 corrects tones of the input CMYK signals. The CMYK signals output from the tone adjustment section 134 are delivered to a tone processing section 135. The tone processing section 135 subjects the input CMYK signals to, for instance, an error spread method, in accordance with the number of recordable bits of the color printer section 2. Signals C, M, Y and K output from the tone processing section 135 are delivered to the color printer section 2.

The image data R, G, B output from the color scanner section 1 is also sent to an area discrimination section 136. Based on the input image data R, G, B, the area discrimination section 136 discriminates whether a pixel of interest belongs to a character or a photo, and to which original type it belongs. An area discrimination output signal 141 output from the area discrimination section 136 is delivered to the main CPU 31.

Figure 4:
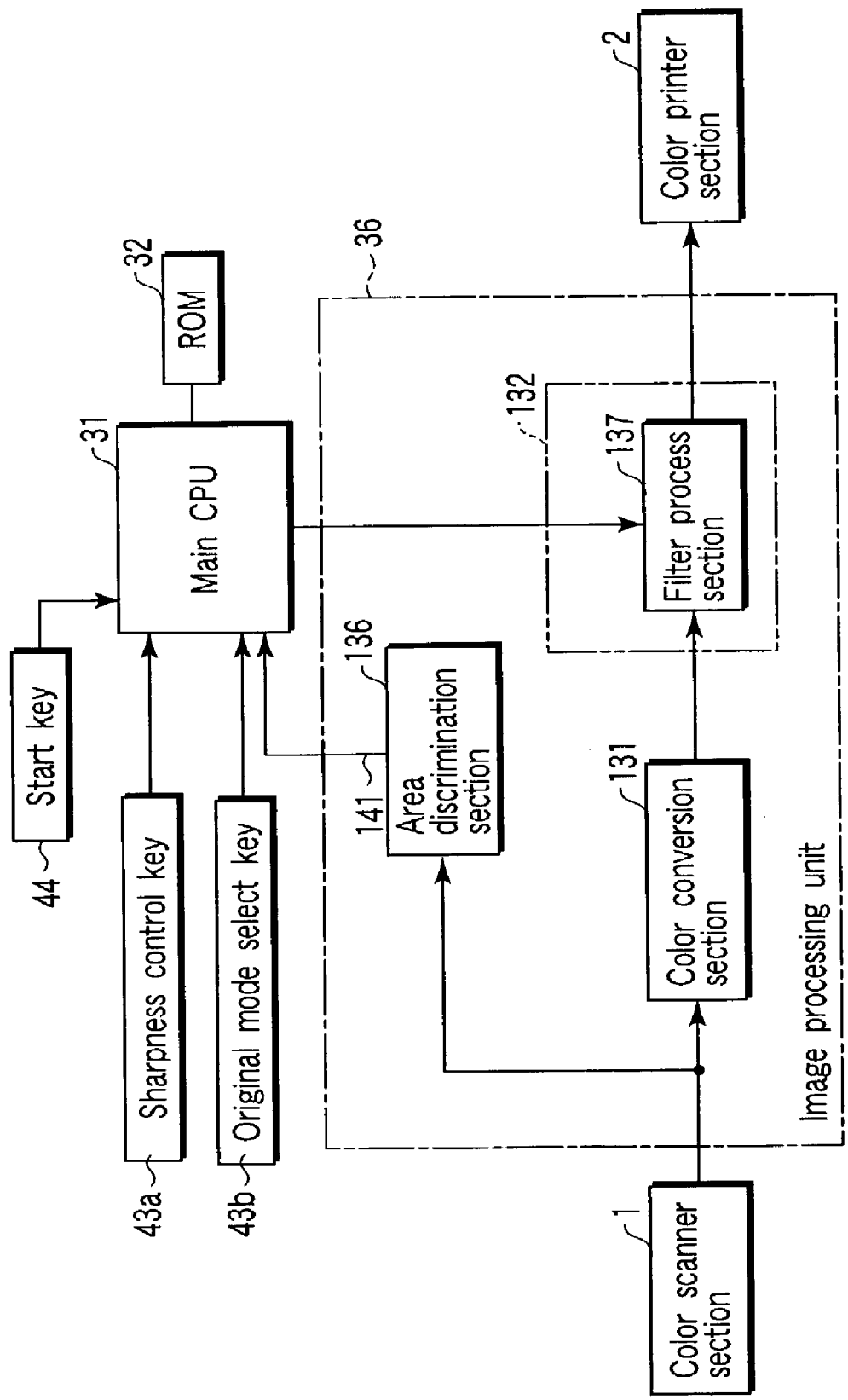
FIG. 4 is a block diagram schematically showing the structure of a main part of the image processing unit.

FIG. 4 schematically shows the structure of the main part of the invention. For simple description, FIG. 4 shows only the color conversion section 131, area discrimination section 136 and image processing section 132 as structural elements of the image processing unit 36.

In FIG. 4, the sharpness control key 43a, original mode select key 43b, start key 44 and ROM 32 are connected to the main CPU 31.

The ROM 32 stores a plurality of basic filter coefficients FLT[i] and decimal-point reference positions BITB prepared for filter processing.

The image processing section 132 is provided with a filter process section 137.

The main CPU 31 performs arithmetic operations to set filter coefficients and decimal-point reference positions for the filter process section 137.

FIG. 5 schematically shows the structure of the filter process section 137. The filter process section 137 comprises a filter coefficient register 201 and a filter process arithmetic section 202.

The filter coefficient register 201 temporarily stores a calculation result of the main CPU 31, as will be described later in detail.

The filter process arithmetic section 202 comprises a matrix arithmetic section 211 and a processing section 212. The matrix arithmetic section 211 performs multiplication and addition of filter coefficients for input image data. The processing section 212 performs a bit-shift process and a clip process.

Figure 6:
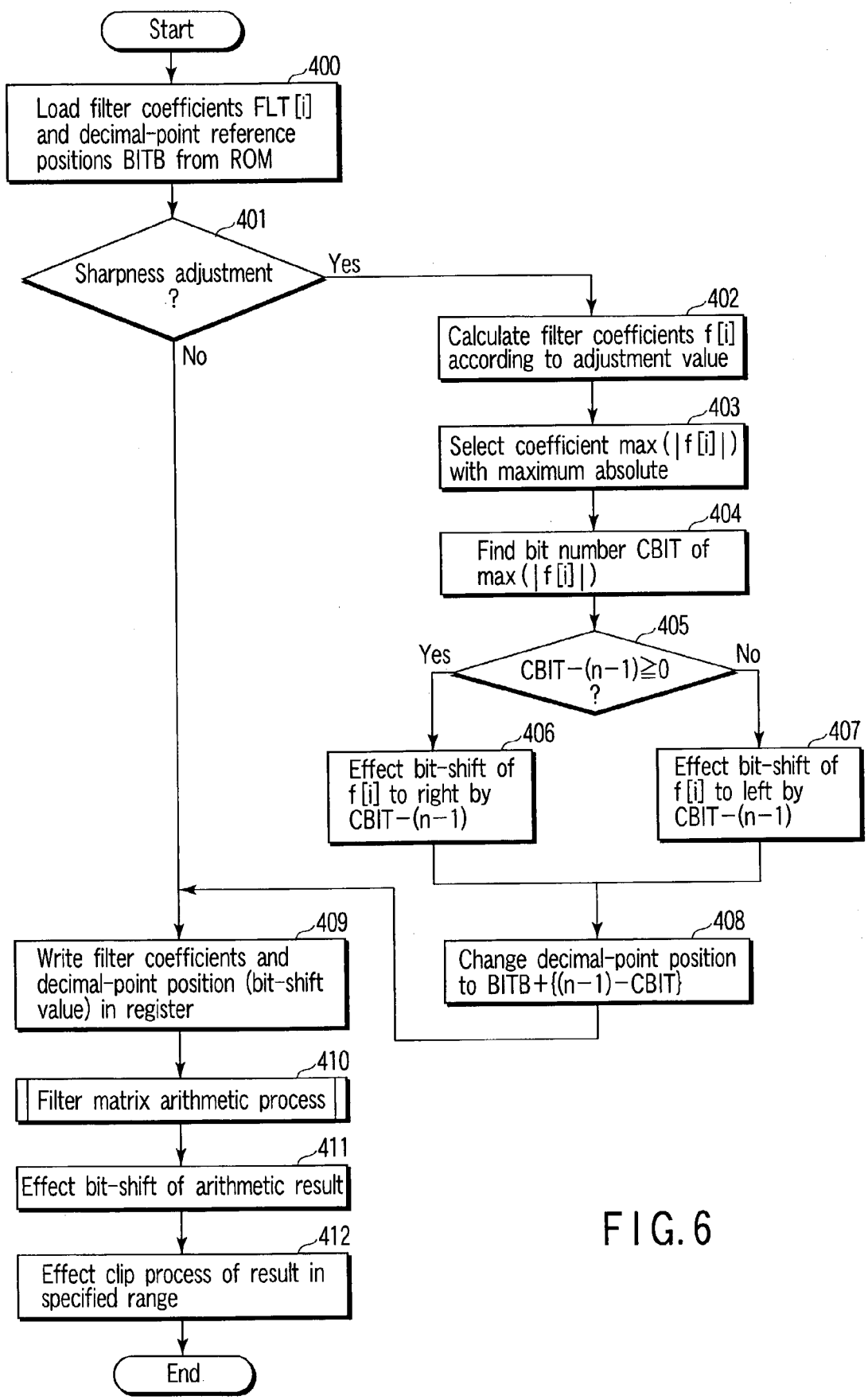
FIG. 6 is a flow chart illustrating a filtering process.

The filtering operation of the present invention with the above-described structure will now be described with reference to a flow chart of FIG. 6.

When the start key 44 has been depressed, the main CPU 31 reads the image data of the original by means of the color scanner section 1. The image data R, G, B read by the color scanner section 1 is input to the image processing apparatus 36. The image data R, G, B input to the image processing apparatus 36 is converted to color signals C, M, Y through the color conversion section 131. The color signals C, M, Y are delivered to the filter process section 137 in the image processing section 132.

On the other hand, the area discrimination section 136 of image processing unit 36 discriminates, based on the input image data R, G, B, whether a pixel of interest belongs to a character or a photo, and to which original type it belongs. An area discrimination signal 141, which represents a discrimination result, is delivered to the main CPU 31.

Based on the area discrimination signal 141 and the original mode selected by the original mode select key 43b, the main CPU 31 selects and loads basic filter coefficients FLT[i] and decimal-point reference positions BITB from the ROM 32 (step 400). Each filter coefficients stored in the ROM 32 is retained as an integer within a range of bit width n in the filter coefficient register 201 in which it is to be temporarily stored, and an integer BITB is also retained as a decimal-point position. When the number of coefficients that constitute one kind of filter is "m", the value "i" is an integer in a range of 1, . . . ,m.

Subsequently, the main CPU 31 determines whether the degree of sharpness has been adjusted through the sharpness adjustment key 43a on the operation panel 40 (step 401).

If it is determined in step 401 that the degree of sharpness has been adjusted, the main CPU 31 re-calculates the filter coefficients FLT[i] in accordance with the adjustment value set by the sharpness adjustment key 43a, thus producing a calculation result f[i] (step 402).

Subsequently, the main CPU 31 selects a coefficient max (f[i]) that takes a maximum absolute value (step 403). The max (f[i]) is in a range of $0 \leq i \leq m$.

The main CPU 31 calculates a bit number CBIT between a lowest bit and a highest bit, which are obtained by expressing the selected max (f[i]) in binary form (step 404). The main CPU 31 then determines whether CBIT−(n−1)≧0 (step 405). The numeral "n" indicates the bit width of the filter coefficient register 201 in which the filter coefficients are to be stored, as mentioned above.

When CBIT−(n−1)≧0 in step 405, the main CPU 31 effects a bit shift of f[i] to the right by {CBIT−(n−1)} (step 406).

When CBIT−(n−1)<0 in step 405, the main CPU 31 effects a bit shift of f[i] to the left by {(n−1)−CBIT} (step 407).

The main CPU 31 changes the decimal-point position to BITB+{(n−1)−CBIT} (step 408).

The main CPU 31 writes into the filter coefficient register 201 the bit-shifted filter coefficients f[i] (steps 402 to 408) and the decimal-point reference position BITB+{(n−1)−CBIT} (step 409).

If the degree of sharpness has not been adjusted in step 401, or if such adjustment as to require no re-calculation of the filter coefficients has been performed, the main CPU 31 writes into the filter coefficient register 201 the filter coefficients loaded in step 400 as "f[i]=FLT[i]" and the decimal-point reference position "BITB" (step 409).

Using the filter coefficient values f[i] written in the filter coefficient register 201 by the main CPU 31, the filter process section 137 subjects the image data (color signals CMY) input from the color conversion section 131 to a matrix arithmetic process by means of the matrix arithmetic section 211 of filter process arithmetic section 202 (step 410).

Subsequently, in the filter process section 137, the processing section 212 of filter process arithmetic section 202 effects a bit shift of the calculation result of the matrix arithmetic section 211 to the right by the number of the decimal-point reference position ("BITB" or "BITB+{(n−1)−CBIT}") written in the filter coefficient register 201 by the main CPU 31 (step 411).

Further, in the filter process section 137, the processing section 212 of the filter process arithmetic section 202 rounds off the decimal point of the bit-shift result and performs a clip process to set the result within a specified range, thus producing output image data (step 412). The clip process, in this context, means a process wherein if the input image data is 8-bit data, the output image data is set at "0" when the calculation result is "0" or less and the output image data is set at "255" when the calculation result is "255" or more.

The output image data (color signals CMY) filtered by the filter process section 137 is delivered to the black signal generating section 133, tone adjustment section 134 and tone processing section 135. The output from the tone processing section 135 is supplied to the color printer section 2 as a printer output signal.

As has been described above, according to the present invention, the filtering process is carried out by performing the bit-shift arithmetic operation in accordance with the calculated filter coefficients. Therefore, an adverse effect of an error can be reduced under a limited hardware condition, without increasing the scale of hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which reads a color image on an original and subjects a signal of the read color image to image processing, thus forming a color image, the apparatus comprising:
    an image reading section which reads a color image on an original;
    a first memory section which stores basic filter coefficients and decimal-point reference position information for subjecting a color image signal of the color image read by the image reading section to image processing;
    a second memory section which has a predetermined bit width and stores filter coefficients;
    a calculation section which re-calculates, when a degree of sharpness has been adjusted in the image processing, the basic filter coefficients stored in the first memory section in accordance with a value of the adjustment;
    a computing section which calculates a bit number between a lowest bit and a highest bit, which are obtained by expressing in binary form a coefficient with a maximum absolute value of the filter coefficients calculated by the calculation section;
    a first processing section which effects a bit shift of the filter coefficients calculated by the calculation section and stores the bit-shifted filter coefficients in the second memory section, on the basis of the bit number calculated by the computing section and the bit width of the second memory section;
    an altering section which alters the decimal-point reference position information on the basis of the decimal-point reference position information stored in the first memory section and the bit width of the second memory section;
    an arithmetic section which subjects the filter coefficients stored in the second memory section and the color image signal of the color image read by the image reading section to a matrix arithmetic operation in the processing of the first processing section; and
    a second processing section which effects a bit shift of the image signal produced by the arithmetic section, on the basis of the decimal-point reference position information altered by the altering section.

2. The image forming apparatus according to claim 1, wherein the basic filter coefficients and decimal-point reference position information stored in the first memory section are selected from a plurality of basic filter coefficients and decimal-point reference position information, on the basis of one of original modes, including a standard mode, a character mode and a photo mode, and an area discrimination signal that discriminates an area of each pixel of interest in the color image signal of the color image read by the image reading section.

3. The image forming apparatus according to claim 1, wherein the adjustment value used in the calculation section is input through a sharpness adjustment key on an operation panel.

4. The image forming apparatus according to claim 1, wherein the second memory section is a register having a bit width n.

5. The image forming apparatus according to claim 1, wherein the first processing section determines whether CBIT−(n−1)≧0 (step 405), based on the bit number CBIT calculated by the calculation section and the bit width n of the second memory section, and when CBIT−(n−1)≧0, the first processing section effects a bit shift of the filter coefficients calculated by the calculation section to the right by {CBIT−(n−1)}, and when CBIT−(n−1)<0, the first processing section effects a bit shift of the filter coefficients calculated by the calculation section to the left by {(n−1)−CBIT}.

6. The image forming apparatus according to claim 1, wherein the altering section changes the decimal-point reference position information to BITB+{(n−1)−CBIT}, based on the decimal-point reference position information BITB stored in the first memory section, the bit number CBIT calculated by the calculation section and the bit width n of the second memory section.

7. The image forming apparatus according to claim 1, wherein the second processing section effects a bit shift of the image signal calculated by the arithmetic section to the right by a degree corresponding to the decimal-point reference position information, BITB+{(n−1)−CBIT}, changed by the altering section.

8. The image forming apparatus according to claim 1, wherein the second processing section sets the bit-shifted image signal within a specified range.

9. An image forming method for forming a color image by reading a color image on an original and subjecting a signal of the read color image to image processing, the method comprising:

reading a color image on an original;

storing basic filter coefficients and decimal-point reference position information for subjecting a color image signal of the read color image to image processing;

re-calculating, when a degree of sharpness has been adjusted in the image processing, the stored basic filter coefficients in accordance with a value of the adjustment;

calculating a bit number between a lowest bit and a highest bit, which are obtained by expressing in binary form a coefficient with a maximum absolute value of the calculated filter coefficients;

performing a process for effecting a bit shift of the calculated filter coefficients and storing the bit-shifted filter coefficient, on the basis of the calculated bit number and a bit width of a memory section that stores the calculated filter coefficients;

altering the decimal-point reference position information on the basis of the stored decimal-point reference position information and the bit width of the memory section;

subjecting the filter coefficients stored in the memory section and the color image signal of the read color image to a matrix arithmetic operation in said process; and effecting a bit shift of the image signal produced by the matrix arithmetic operation, on the basis of the altered decimal-point reference position information.

* * * * *